United States Patent
Gong et al.

(10) Patent No.: US 11,530,615 B1
(45) Date of Patent: Dec. 20, 2022

(54) METHOD FOR CONSTRUCTING A FIXED-VANE RING FOR A NOZZLE OF A TURBOCHARGER TURBINE

(71) Applicant: Garrett Transportation I Inc., Torrance, CA (US)

(72) Inventors: Yunbin Gong, Shanghai (CN); Jianfeng Du, Shanghai (CN); Zhiqiang Li, Shanghai (CN); Guijun Yang, Shanghai (CN)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/653,110

(22) Filed: Mar. 1, 2022

(51) Int. Cl.
  *F01D 9/04* (2006.01)
  *B23P 15/04* (2006.01)

(52) U.S. Cl.
  CPC .............. *F01D 9/041* (2013.01); *B23P 15/04* (2013.01); *F05D 2230/60* (2013.01)

(58) Field of Classification Search
  CPC .......... F01D 9/042; F01D 9/044; F01D 9/045; F01D 9/047; Y10T 29/49323; Y10T 29/4932; Y10T 29/49316
  See application file for complete search history.

(56) References Cited

U.S. PATENT DOCUMENTS

| | | | | |
|---|---|---|---|---|
| 953,526 A * | 3/1910 | Green | ........................ | F01D 5/24 416/196 R |
| 961,329 A * | 6/1910 | Wait | ........................ | F01D 9/042 415/191 |
| 1,158,755 A * | 11/1915 | Weaver | .................. | F01D 25/285 416/61 |
| 1,470,507 A * | 10/1923 | Steenstrup | ............ | B23P 15/006 29/889.21 |
| 1,497,081 A * | 6/1924 | Wait | ........................ | F01D 9/047 415/185 |
| 1,717,203 A * | 6/1929 | Gottschalk | .............. | F01D 9/042 416/213 R |
| 2,417,486 A * | 3/1947 | Hagemann | .............. | F01D 9/047 415/178 |
| 2,739,782 A * | 3/1956 | White | ..................... | F01D 9/045 415/150 |
| 3,038,698 A * | 6/1962 | Troyer | .................... | F01D 5/148 415/12 |
| 3,802,046 A * | 4/1974 | Wachtell | ................. | F01D 9/045 416/213 A |
| 4,575,911 A * | 3/1986 | Laszlo | .................... | F01D 9/044 29/445 |
| 5,207,559 A * | 5/1993 | Clevenger | ............. | F04D 29/462 415/166 |

(Continued)

*Primary Examiner* — Jason L Vaughan
(74) *Attorney, Agent, or Firm* — John C. James (57) ABSTRACT

A method for constructing a nozzle ring for a turbocharger turbine nozzle includes the steps of: providing a nozzle ring in the form of an annular flat disk, the nozzle ring having a first face and an opposite second face; forming a plurality of circumferentially spaced circular bores extending through the nozzle ring from the first face to the second face; providing a plurality of vanes, each vane having a circular vane shaft extending from one end of the vane; inserting the vane shafts respectively into the bores in the nozzle ring from said first face thereof and orienting each vane to achieve a desired setting angle for the vane; and rigidly affixing the vane shafts to the nozzle ring to fix the vanes at the desired setting angles.

4 Claims, 10 Drawing Sheets

(56) References Cited

U.S. PATENT DOCUMENTS

| | | | | |
|---|---|---|---|---|
| 6,419,464 B1* | 7/2002 | Arnold | ............... | F01D 5/18 |
| | | | | 415/164 |
| 7,089,664 B2* | 8/2006 | Ohishi | ............... | B21K 3/04 |
| | | | | 29/889.7 |
| 7,118,322 B2* | 10/2006 | Mortgat | ............... | F01D 17/16 |
| | | | | 415/12 |
| 8,511,981 B2* | 8/2013 | Small | ............... | F04D 25/163 |
| | | | | 415/209.2 |
| 8,616,836 B2* | 12/2013 | Blair | ............... | F04D 25/163 |
| | | | | 416/207 |
| 9,803,486 B2* | 10/2017 | Freeman | ............... | B23P 15/04 |
| 9,995,158 B2* | 6/2018 | Henderson | ............... | F01D 9/026 |
| 10,844,465 B2* | 11/2020 | Wilson | ............... | F02C 6/12 |
| 11,085,311 B2* | 8/2021 | Eckl | ............... | F02B 33/40 |
| 11,248,488 B2* | 2/2022 | Eckl | ............... | F02B 37/025 |
| 2004/0213665 A1* | 10/2004 | Ohishi | ............... | C22C 38/40 |
| | | | | 415/151 |
| 2012/0082539 A1* | 4/2012 | Mohiki | ............... | F01D 17/165 |
| | | | | 415/159 |
| 2014/0286750 A1* | 9/2014 | Laubender | ............... | F01D 9/045 |
| | | | | 415/115 |
| 2015/0050135 A1* | 2/2015 | Grilli | ............... | F01D 9/042 |
| | | | | 29/889.22 |
| 2016/0326951 A1* | 11/2016 | Groves | ............... | F02B 33/40 |
| 2022/0074314 A1* | 3/2022 | Biswas | ............... | F01D 25/24 |

* cited by examiner

METHOD FOR CONSTRUCTING A FIXED-VANE RING FOR A NOZZLE OF A TURBOCHARGER TURBINE

BACKGROUND OF THE INVENTION

This application relates generally to turbochargers for internal combustion engines, and relates more particularly to turbochargers having a turbine nozzle that includes an array of fixed vanes for guiding exhaust gases to the turbine wheel.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically, the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

In the turbines of some exhaust gas-driven turbochargers, the turbine nozzle includes an array of vanes whose function is to guide and regulate the flow of exhaust gases from the annular chamber to the turbine wheel. Some turbochargers include vanes that are variable in setting angle, while others employ fixed vanes. The present disclosure concerns turbocharger turbine nozzles having fixed vanes.

Fabrication of a fixed-vane ring for a nozzle is typically accomplished by casting a monolithic part consisting of an annular ring and a plurality of vanes extending from one side of the ring. Because different turbocharger designs require vane rings with different configurations, each design requires a dedicated mold design for casting. Modification of the vane ring configuration in any manner necessitates a redesign of the mold tooling. Even if the only modification to be made is a change in the setting angles of the vanes, a new set of mold tooling must be designed and built.

SUMMARY OF THE DISCLOSURE

The present disclosure describes a method for constructing a fixed-vane ring for the turbine of a turbocharger, having certain advantages over the conventional casting approach described above. In accordance with one embodiment of the invention, a method for constructing a fixed-vane ring for a nozzle of a turbocharger turbine comprises the steps of:
  providing a nozzle ring comprising an annular flat disk, the nozzle ring having a first face and an opposite second face;
  forming a plurality of circumferentially spaced circular bores extending through the nozzle ring from the first face to the second face;
  providing a plurality of vanes, each vane having a circular vane shaft extending from one end of the vane;
  inserting the vane shafts respectively into the bores in the nozzle ring from said first face thereof, each vane being oriented at a desired setting angle; and
  rigidly affixing the vane shafts to the nozzle ring to fix the vanes at the desired setting angles.

In one embodiment, the rigidly affixing step comprises riveting the vane shafts to the nozzle ring. In an alternative embodiment, the rigidly affixing step comprises welding the vane shafts to the nozzle ring.

In some embodiments, the nozzle ring is provided to be constructed of a first material, and the vanes are provided to be constructed of a second material that is different from the first material.

The nozzle ring optionally can be provided to have an annular groove formed in the second face, the bores being located within said groove. The groove accommodates the distal ends of the vane shafts protruding slightly from the bores in the nozzle ring, so that the upset ends of the shafts (when riveted) or welds (when the shafts are welded) do not protrude beyond an outer extremity of the second face of the nozzle ring.

Methods in accordance with embodiments of the invention allow multiple identically configured nozzle rings to be assembled with multiple sets of identically configured vanes to produce multiple differently configured vane rings having the vanes set at different setting angles. Alternatively, the methods of the invention can enable multiple identically configured nozzle rings to be assembled with multiple sets of differently configured vanes to produce multiple differently configured vane rings.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
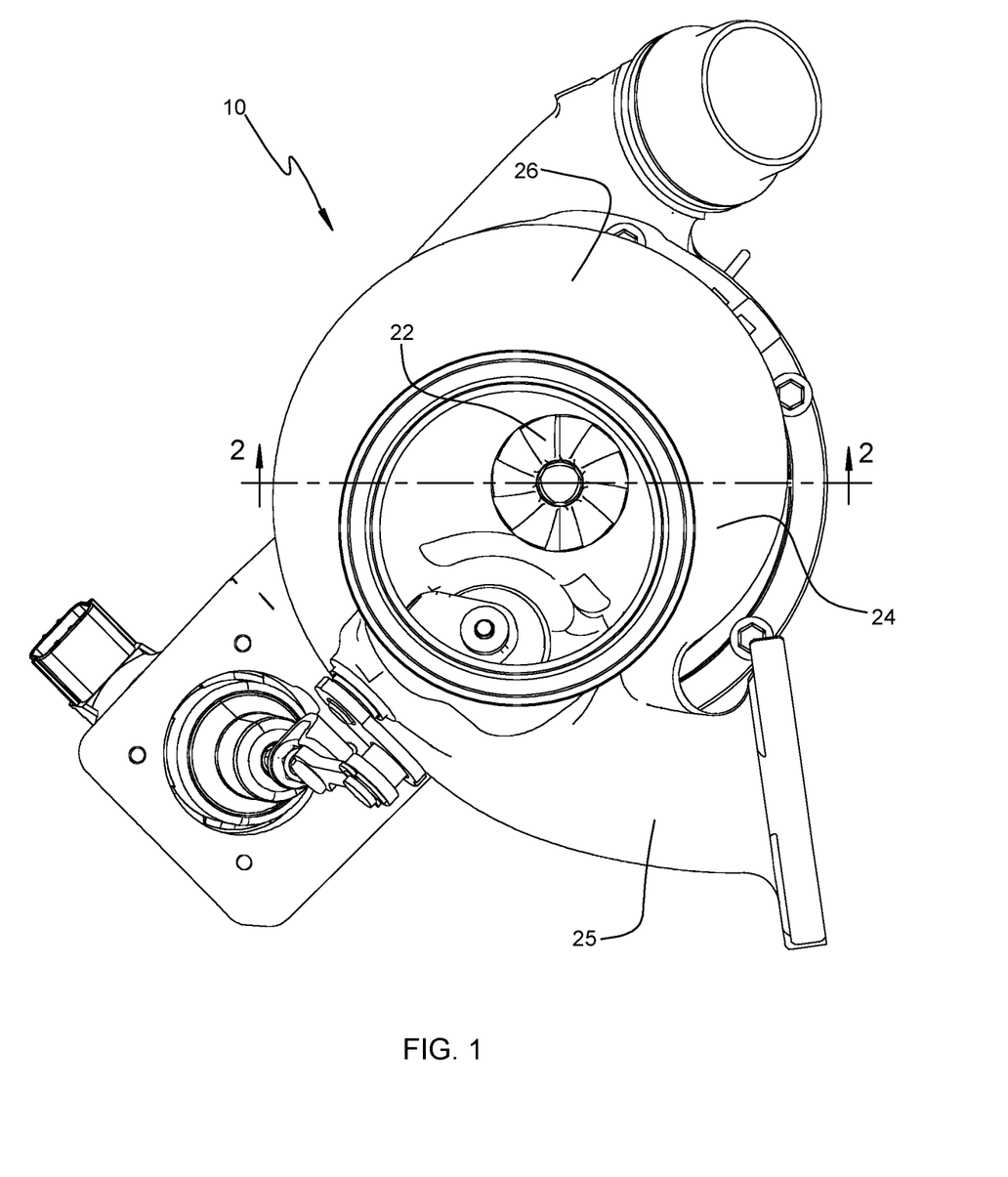
FIG. 1 is an end view of a turbocharger according to one exemplary embodiment of the present invention.
Figure 2:
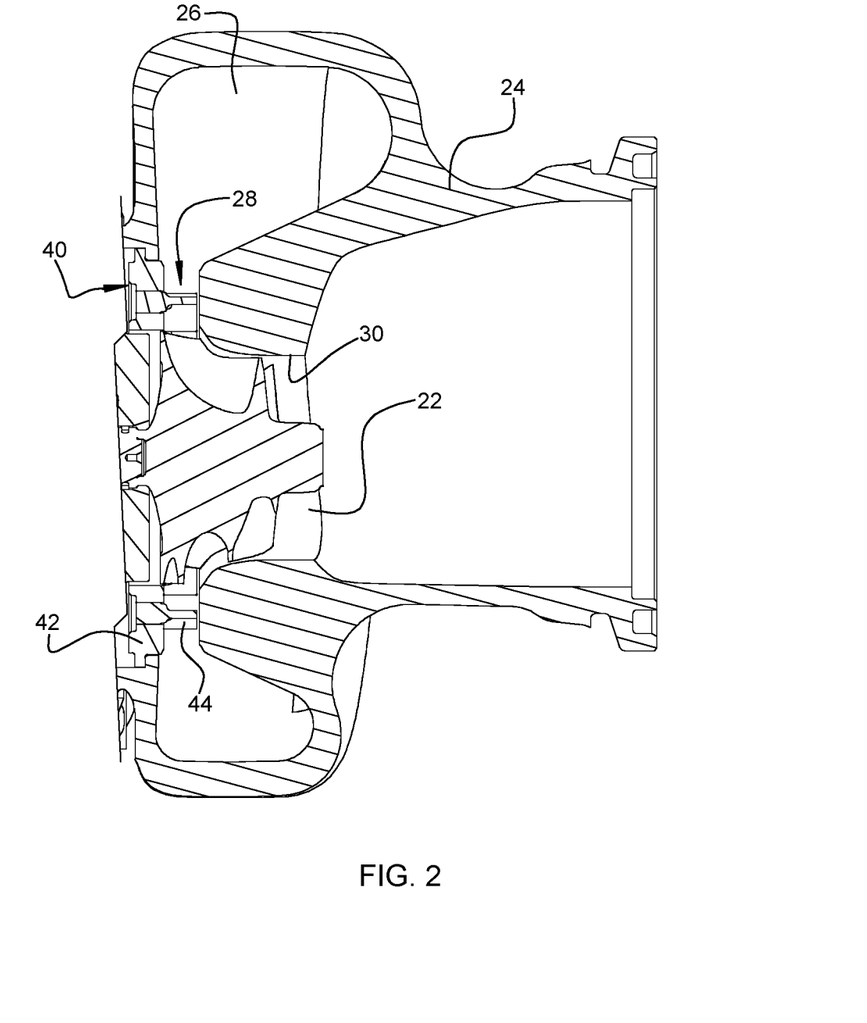
FIG. 2 is a cross-sectional view through the turbine assembly of the turbocharger, along line 2-2 in FIG. 1.
Figure 3:
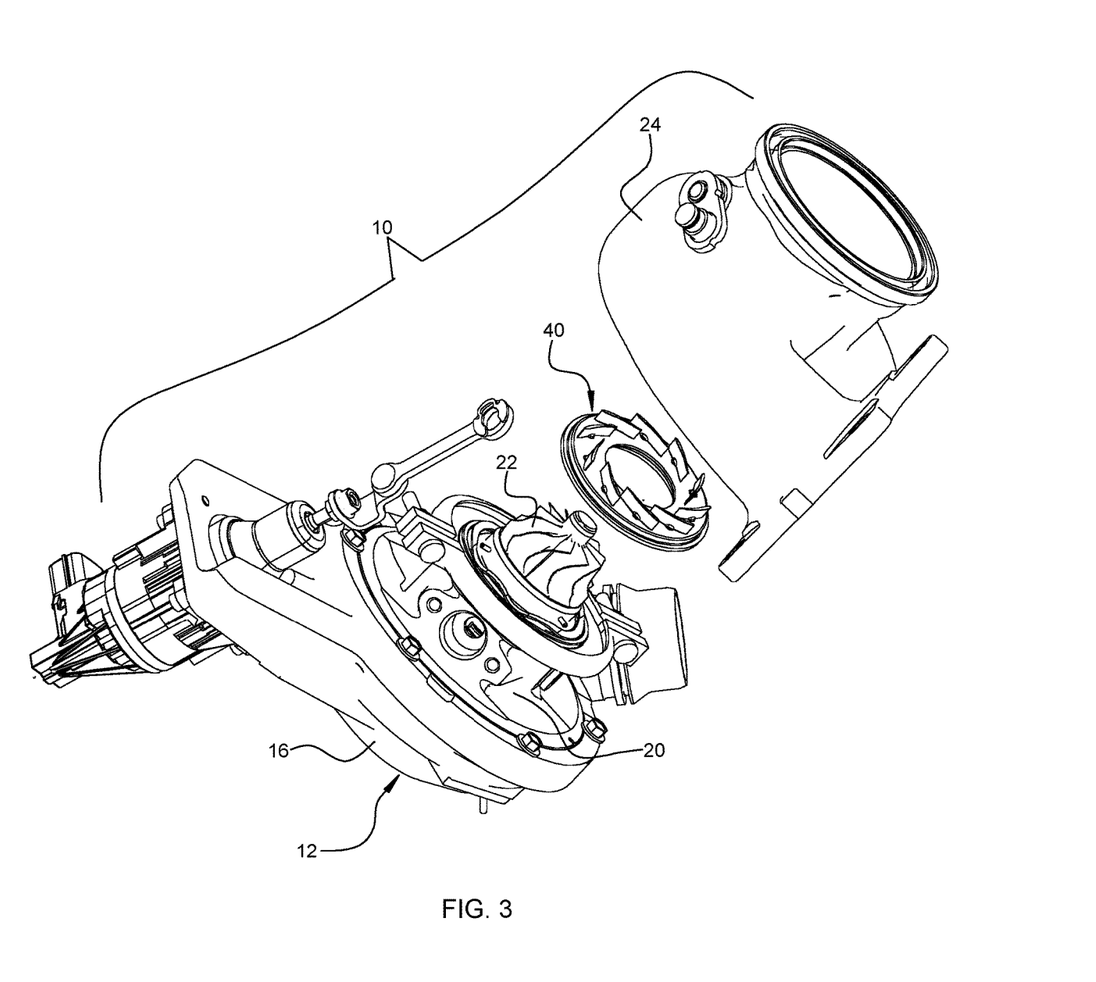
FIG. 3 is an exploded view of the turbocharger of FIG. 1.

FIGS. 1-3 illustrate a turbocharger 10 according to one exemplary embodiment of the invention. The turbocharger includes a compressor 12 (FIG. 3) comprising a compressor wheel (not visible) mounted within a compressor housing 16, for receiving air and compressing the air so that it can be fed to the intake of an internal combustion engine. The turbocharger further comprises a turbine comprising a turbine wheel 22 mounted within a turbine housing 24 and connected by a rotary shaft to the compressor wheel. A center housing 20 contains bearings for the rotary shaft. The turbine housing defines an exhaust gas inlet 25 and an annular chamber 26 that surrounds the turbine wheel 24. Exhaust gases from the internal combustion engine are fed through the exhaust gas inlet into the annular chamber. The turbine housing defines a nozzle 28 (FIG. 2) that directs exhaust gases from the annular chamber generally radially inwardly to the turbine wheel 22, and as the gases are expanded in their passage through the turbine wheel, the turbine wheel is rotatably driven, thereby driving the compressor wheel to compress the air for the engine. After passing through the turbine wheel, the exhaust gases are discharged out from a bore 30 in the turbine housing and then proceed through an exhaust system for the engine.

As seen in FIG. 2, the turbine nozzle 28 includes a vane ring 40 comprising an annular nozzle ring 42 and a plurality of vanes 44 affixed to the nozzle ring. The vanes extend across the turbine nozzle and the exhaust gases pass through the vane passages, which guide and regulate the flow of exhaust gases to the turbine wheel.

In accordance with conventional fixed-vane rings of the prior art, the nozzle ring 42 and vanes 44 comprise a monolithic part formed by casting (or alternatively by CNC machining of a billet or blank). A drawback of the conventional casting process is that a modification to the turbocharger design usually necessitates a modification to the vane ring configuration as well, such as a change in the setting angles of the vanes. Accordingly, an entirely new set of mold tooling for casting must be designed and built, which is a relatively expensive endeavor. Similarly, changing a machined vane ring configuration necessitates rewriting the CNC control instructions, which also is a relatively involved and expensive process.

Figure 4:
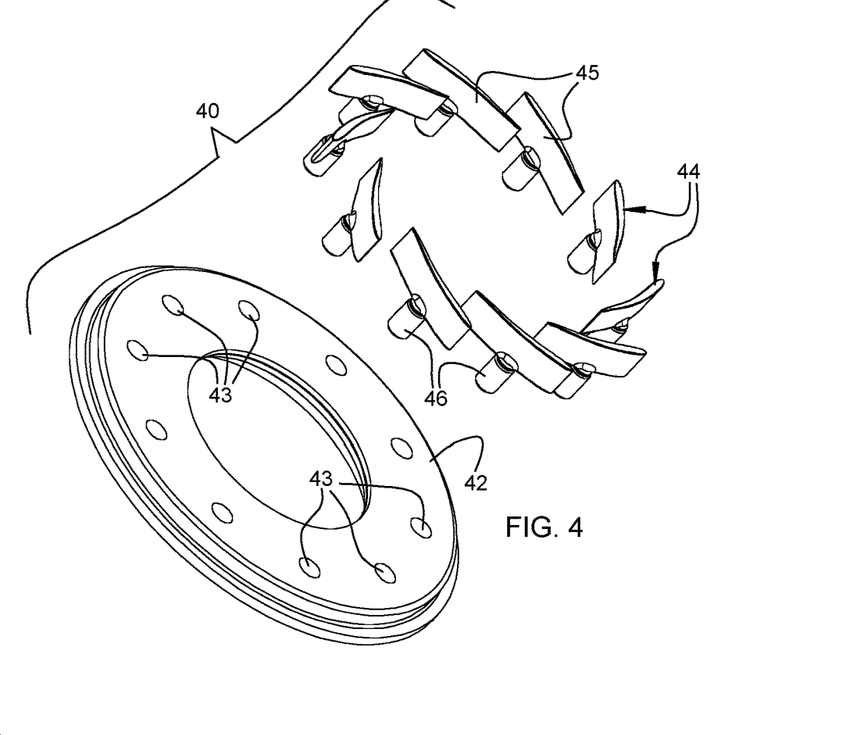
FIG. 4 is an exploded view of a vane ring in accordance with embodiments of the invention.
Figure 5:
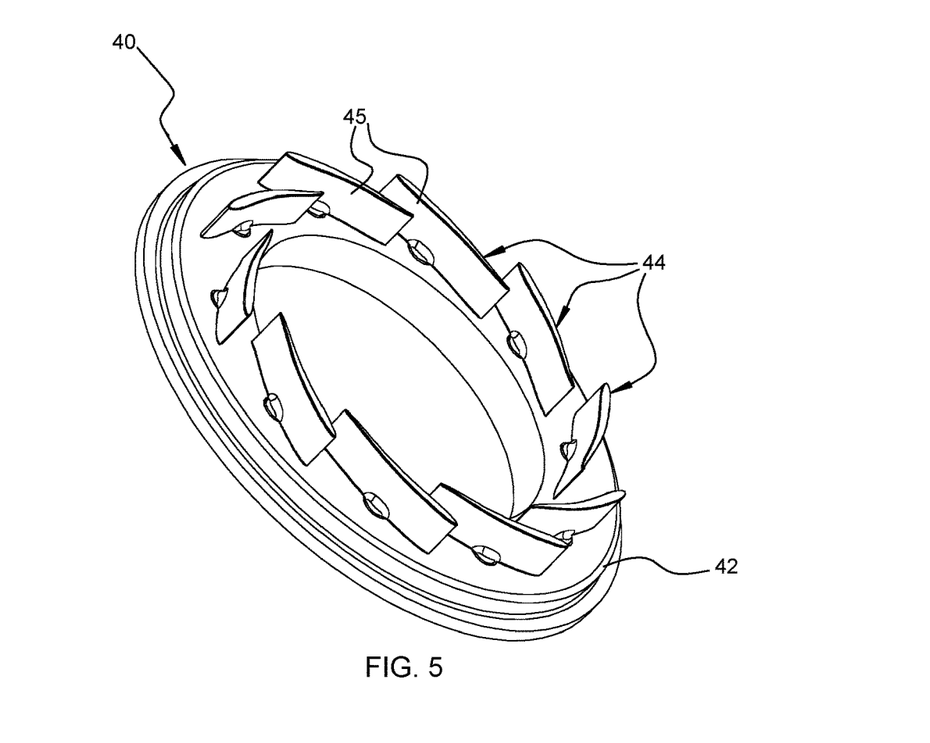
FIG. 5 is an isometric view of the vane ring after the vanes have been mated with the nozzle ring.
Figure 6:
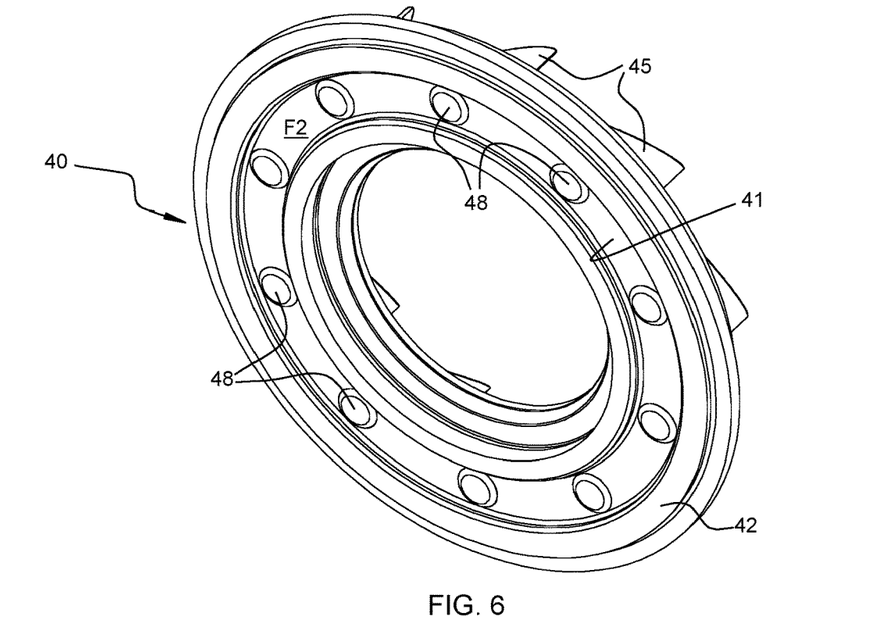
FIG. 6 is another isometric view of the vane ring of FIG. 5.
Figure 7:
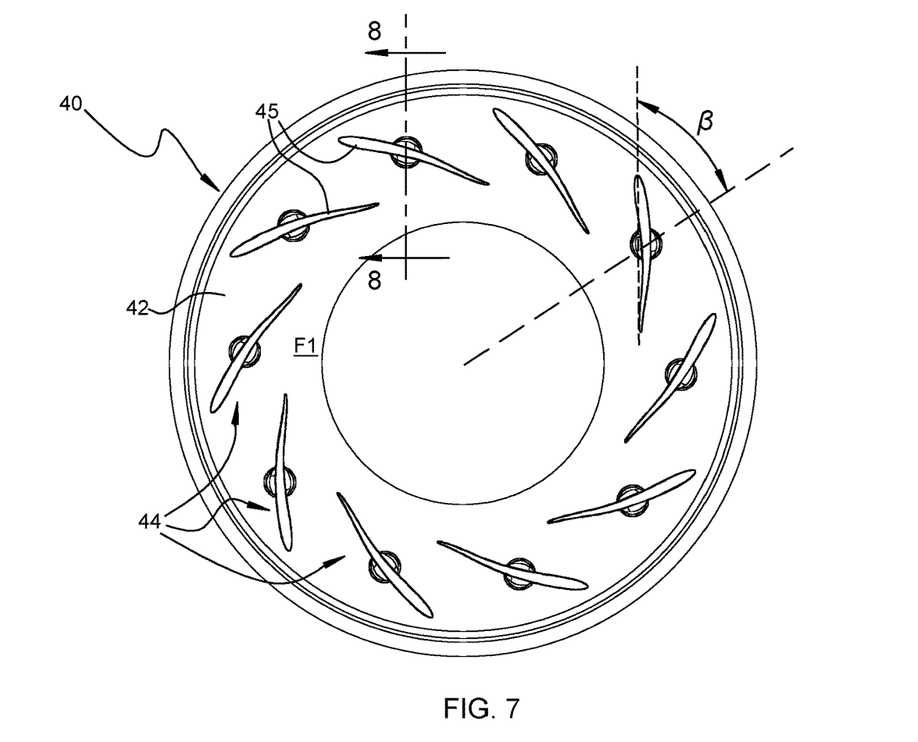
FIG. 7 is an axial view of the vane ring of FIG. 5.
Figure 8:
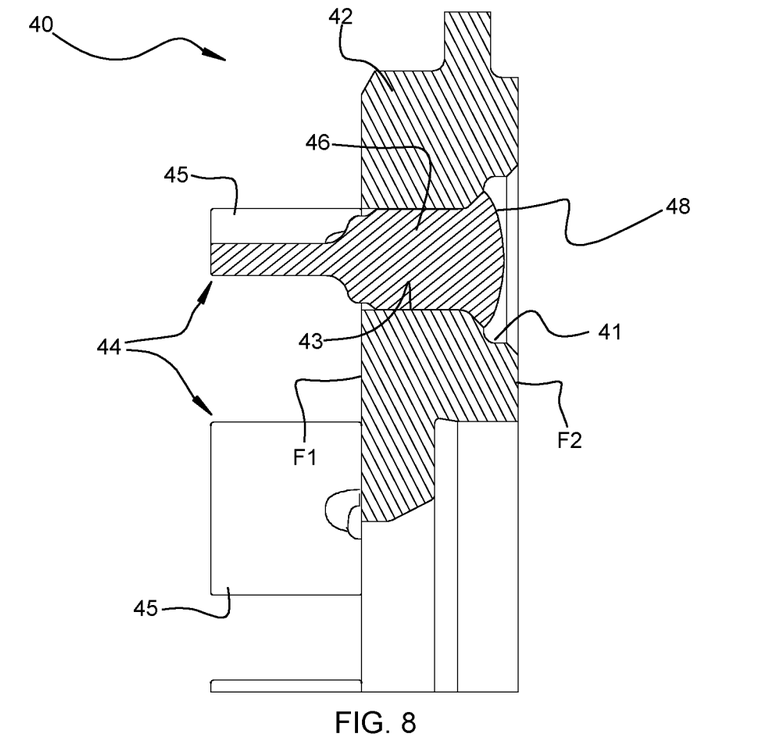
FIG. 8 is a cross-sectional view along line 8-8 in FIG. 7, showing the vane shaft having been riveted to affix the vane shaft to the nozzle ring.
Figure 9:
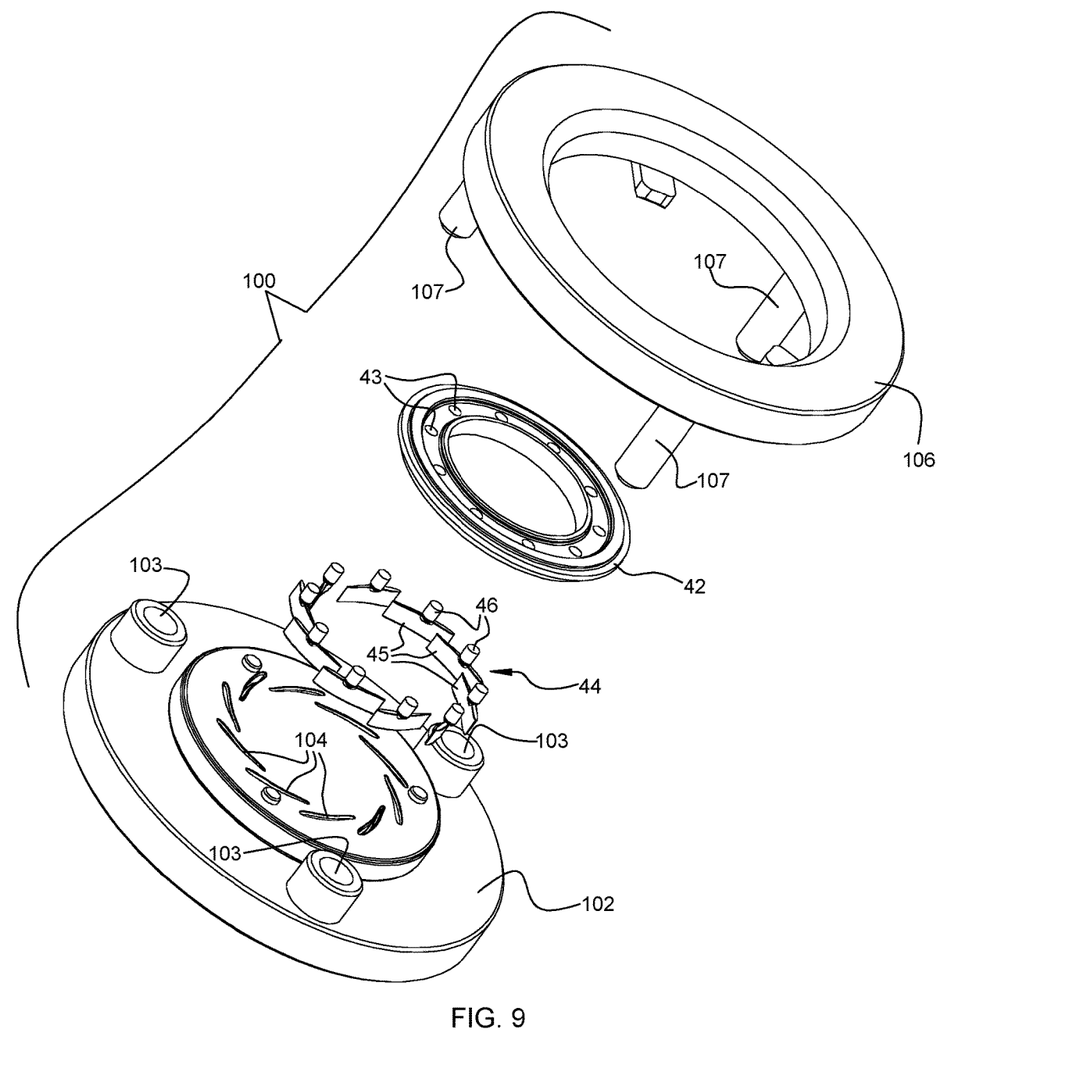
FIG. 9 is an exploded view showing a vane-setting fixture into which the vanes are fitted to set them at the correct setting angles and locations, and also showing the nozzle ring and vanes to be placed into the fixture.

FIGS. 4 through 12 illustrate methods for constructing a vane ring in accordance with the invention, which can facilitate design changes in a relatively quick and simple manner. The method comprises providing a nozzle ring 42 comprising an annular flat disk, the nozzle ring having a first face F1 (FIG. 7) and an opposite second face F2 (FIG. 6; see also FIG. 8). The method includes forming a plurality of circumferentially spaced circular bores 43 extending through the nozzle ring from the first face to the second face (FIGS. 4 and 8). A plurality of vanes 44 are provided, each vane comprising an airfoil portion 45 and a circular vane shaft 46 extending from one end of the airfoil portion of the vane. The method further comprises inserting the vane shafts 46 respectively into the bores 43 in the nozzle ring from said first face thereof (FIG. 5) so that the distal ends of the vane shafts are accessible at the second face of the nozzle ring. The vanes are oriented rotationally (with respect to the axis of rotation of each vane shaft) at a desired setting angle β for each vane (FIG. 7). Then, the vane shafts 46 are rigidly affixed to the nozzle ring 42 to fix the vanes at the desired setting angles and prevent relative motion between the vanes and the nozzle ring.

In accordance with a first embodiment of the invention as shown in FIGS. 6 and 8, the rigid fixing of the vane shafts is accomplished by riveting the distal ends of the vane shafts, i.e., upsetting the ends of the shafts to form enlarged heads 48. Advantageously, a recessed area or groove 41 is formed in the second face F2 of the nozzle ring for accommodating the enlarged heads 48 so that the heads do not protrude farther than the non-recessed portion of the second face of the nozzle ring, as best seen in FIG. 8. This helps to protect the riveted heads of the vane shafts.

A method in accordance with a second embodiment of the invention is generally similar to that of the first embodiment, except instead of riveting the vane shafts 46, the vane shafts are affixed to the nozzle ring via welds. Any suitable welding process can be used, such as laser welding.

Figure 10:
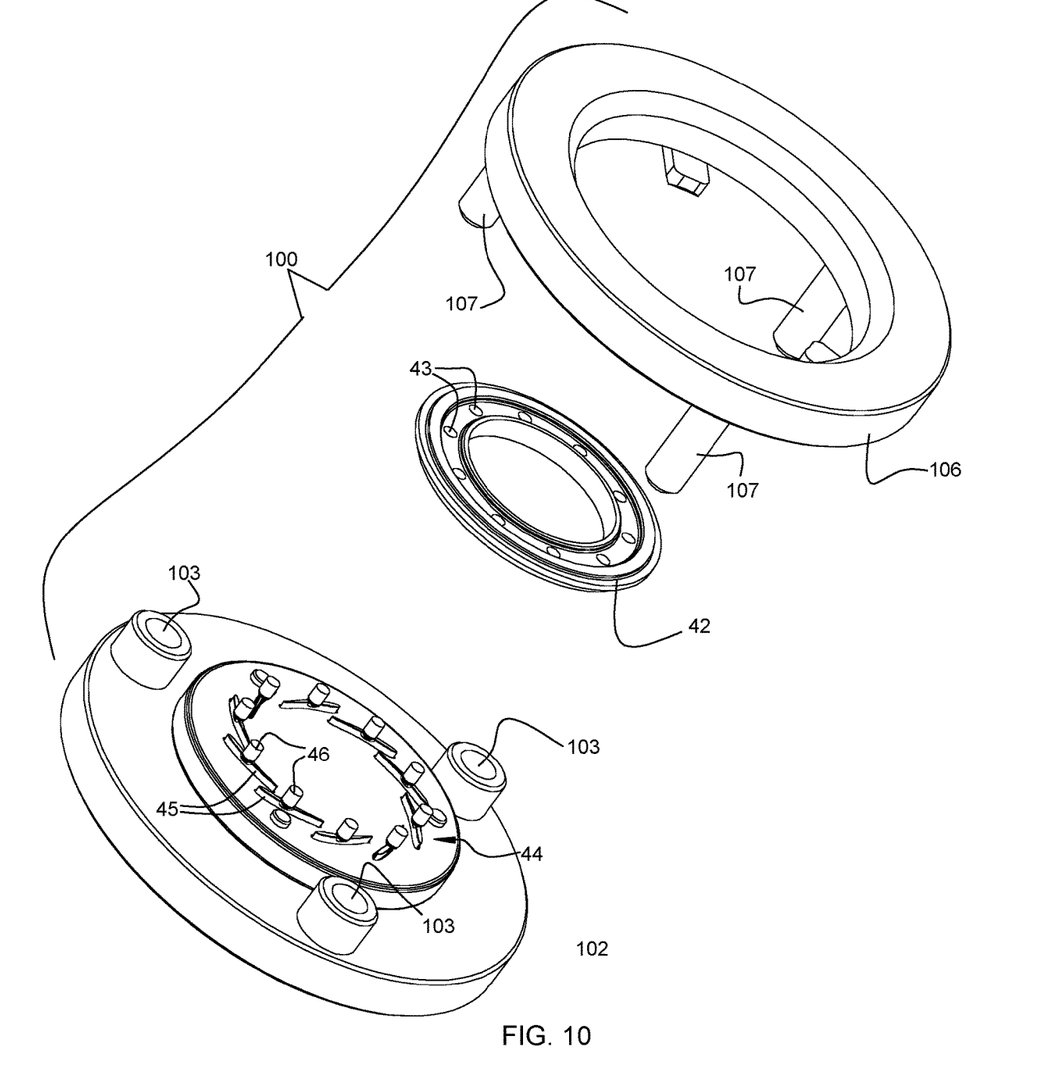
FIG. 10 is a view similar to FIG. 9, showing the vanes having been inserted into the vane-receiving slots in the base of the fixture.
Figure 11:
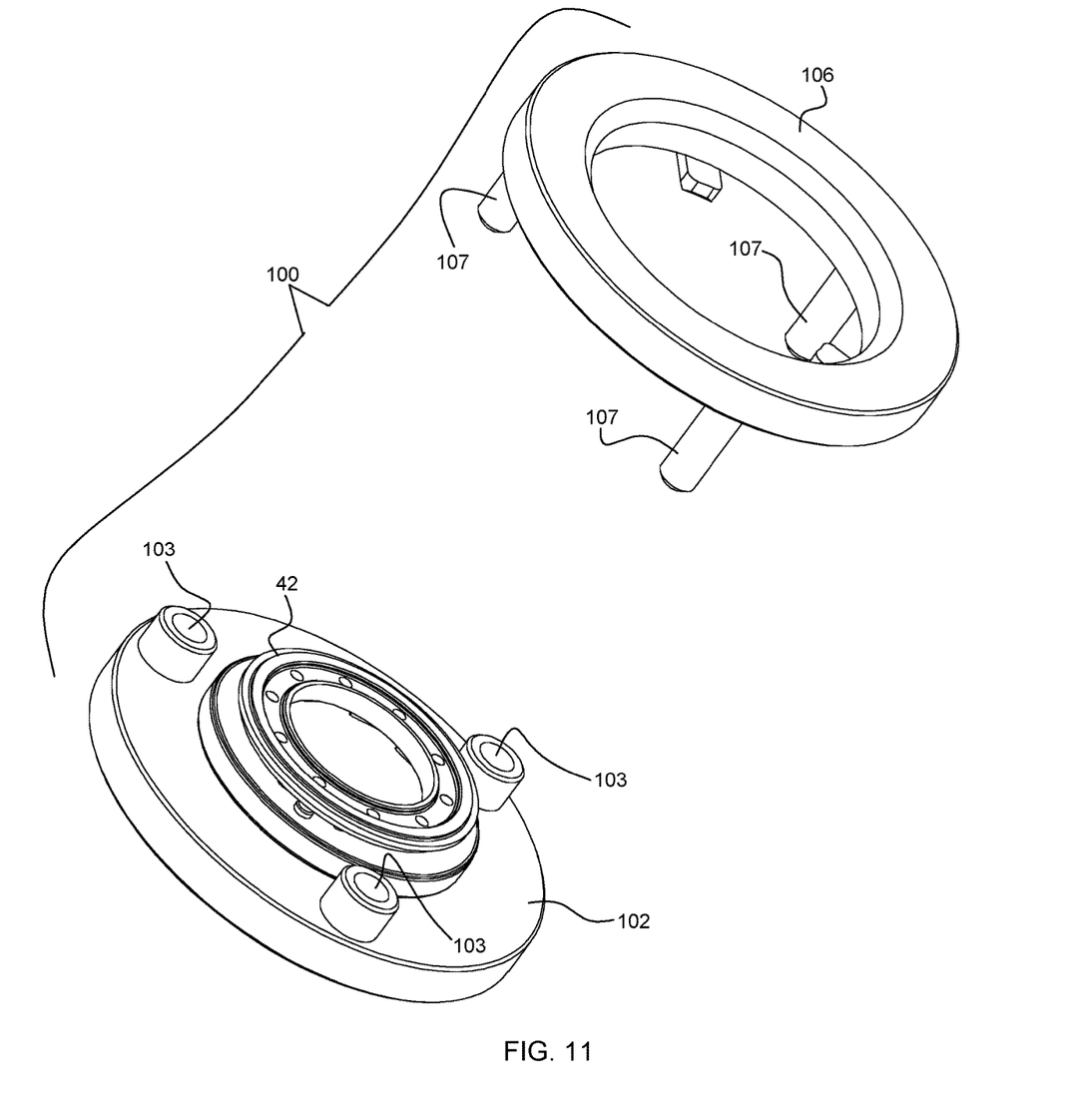
FIG. 11 is a view similar to FIGS. 9 and 10, showing the nozzle ring mated with the vanes in the fixture.
Figure 12:
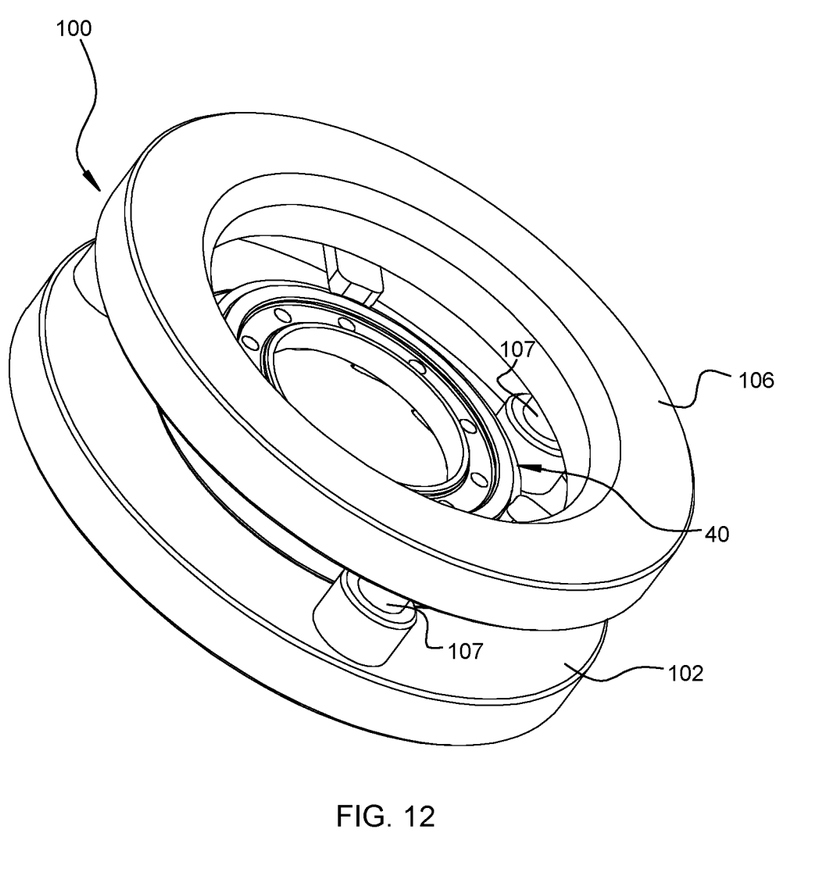
FIG. 12 is an isometric view of the fixture closed to capture the nozzle ring and vanes in preparation for affixing of the vane shafts to the nozzle ring.

FIGS. 9-12 illustrate an optional (although advantageous) mode of practicing the invention in which a fixture 100 is employed to facilitate arranging all the vanes at their proper setting angles and locations. The fixture comprises a base 102 that defines a generally planar upper surface in which a plurality of vane-receiving slots 104 are defined. The slots are configured to receive the airfoil portions 45 of the vanes 44 and orient the airfoil portions at the desired setting angles; the vane shafts 46 project upwardly with respect to the horizontally oriented base (FIG. 10). The fixture includes a cover 106 that includes a plurality of posts or legs 107, which are received into corresponding receptacles 103 in the base. After the vanes are inserted in the slots in the base, the nozzle ring 42 is placed onto the vanes, the vane shafts 46 being received into the bores 43 in the nozzle ring as shown in FIG. 11. The cover 106 is then mated with the base (FIG. 12) to capture the vane ring 40 within the fixture. The vane ring is then ready for the next step of affixing the vane shafts to the nozzle ring via riveting or welding or any other suitable technique.

The invention facilitates a number of advantages over conventional vane ring fabrication processes. As noted, vane rings of various configurations can be constructed from the same configuration of nozzle ring and vanes. For example, it is a simple matter to produce a new vane ring design having the vane setting angles modified as required, using the identically same nozzle ring and vane configurations. Another potential advantage is the ability to make the nozzle ring from one material and the vanes from another different material, something that is not possible by casting or CNC machining methods.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A method for constructing a fixed-vane ring for a nozzle of a turbocharger turbine, comprising the steps of:
providing a nozzle ring comprising an annular flat disk, the nozzle ring having a first face and an opposite second face, an annular groove being formed in the second face;

forming a plurality of circumferentially spaced circular bores extending through the nozzle ring from the first face to the second face, the bores being located within said annular groove in the second face of the nozzle ring;

providing a plurality of vanes, each vane comprising an airfoil portion and a circular vane shaft extending from one end of the airfoil portion;

inserting the vane shafts respectively into the bores in the nozzle ring from said first face thereof, each vane being oriented at a desired setting angle; and rigidly affixing the vane shafts to the nozzle ring to fix the vanes at the desired setting angles.

2. The method of claim 1, wherein the rigidly affixing step comprises riveting the vane shafts to the nozzle ring.

3. The method of claim 1, wherein the rigidly affixing step comprises welding the vane shafts to the nozzle ring.

4. The method of claim 1, wherein the nozzle ring is provided to be constructed of a first material, and the vanes are provided to be constructed of a second material that is different from the first material.

\* \* \* \* \*